(12) United States Patent
Huang (10) Patent No.: US 10,550,822 B2
(45) Date of Patent: Feb. 4, 2020

(54) VANE DEVICE FOR GENERATION OF ELECTRICITY

(71) Applicant: Kuo-Chang Huang, Tainan (TW)

(72) Inventor: Kuo-Chang Huang, Tainan (TW)

( * ) Notice: Subject to any disclaimer, the term of this patent is extended or adjusted under 35 U.S.C. 154(b) by 70 days.

(21) Appl. No.: 15/981,510

(22) Filed: May 16, 2018

(65) Prior Publication Data

US 2018/0335013 A1 Nov. 22, 2018

(30) Foreign Application Priority Data

May 17, 2017 (TW) .............................. 106116293 A (51) Int. Cl.
| | |
|---|---|
| *F03D 9/25* | (2016.01) |
| *F03D 3/04* | (2006.01) |
| *F03D 3/00* | (2006.01) |
| *F03D 3/06* | (2006.01) |

(52) U.S. Cl.
CPC ........... *F03D 3/0427* (2013.01); *F03D 3/002* (2013.01); *F03D 3/061* (2013.01); *F03D 9/25* (2016.05)

(58) Field of Classification Search
None
See application file for complete search history.

(56) References Cited

U.S. PATENT DOCUMENTS

| | | | | |
|---|---|---|---|---|
| 4,044,559 | A * | 8/1977 | Kelly ....................... | F02G 1/044 60/525 |
| 4,403,581 | A * | 9/1983 | Rogachevsky ......... | F01C 1/352 123/239 |
| 5,235,945 | A * | 8/1993 | Testea ..................... | F01C 1/348 123/235 |
| 6,177,735 | B1 * | 1/2001 | Chapman ................ | F01D 15/10 290/44 |
| 6,734,576 | B2 * | 5/2004 | Pacheco ................. | B63H 13/00 290/55 |
| 8,546,966 | B1 * | 10/2013 | Santos ................... | F03B 11/002 290/43 |
| 10,309,370 | B2 * | 6/2019 | Huang .................... | F03D 3/064 |
| 2004/0108679 | A1 * | 6/2004 | Hayes .................... | B60K 16/00 280/213 |
| 2009/0081020 | A1 * | 3/2009 | Caldwell ................. | F03D 3/002 415/4.1 |
| 2009/0180884 | A1 * | 7/2009 | Sauer ...................... | F03B 13/14 416/197 A |
| 2013/0270838 | A1 * | 10/2013 | Diaz Ramirez ........ | H02K 53/00 290/1 R |
| 2016/0053743 | A1 * | 2/2016 | Kiselovs .................. | F03D 3/04 415/211.2 |
| 2017/0130697 | A1 * | 5/2017 | Huang .................... | F03D 3/005 |

* cited by examiner

*Primary Examiner* — Michael Lebentritt
(74) *Attorney, Agent, or Firm* — Muncy, Geissler, Olds & Lowe, P.C.

(57) ABSTRACT

A vane device includes a rotary shaft and vanes. A shroud unit includes a bottom plate section and a blocking plate section. The bottom plate section is disposed below the rotary shaft. The blocking plate section has a bottom end at the rear of the bottom plate section, and a top end disposed at the rear of the vanes in a spaced apart manner. A distance from the top end to the rotary shaft is 1.4 to 3 times the radial length of each vane. The blocking plate section prevents the vanes from rotating in a second direction opposite to a first direction when the vanes rotate in the first direction at a level below the top end of the blocking plate section.

9 Claims, 8 Drawing Sheets

VANE DEVICE FOR GENERATION OF ELECTRICITY

CROSS-REFERENCE TO RELATED APPLICATION

This application claims priority of Taiwanese Patent Application No. 106116293, filed on May 17, 2017.

FIELD

The disclosure relates to a vane device, and more particularly to a vane device for generation of electricity.

BACKGROUND

Figure 1:
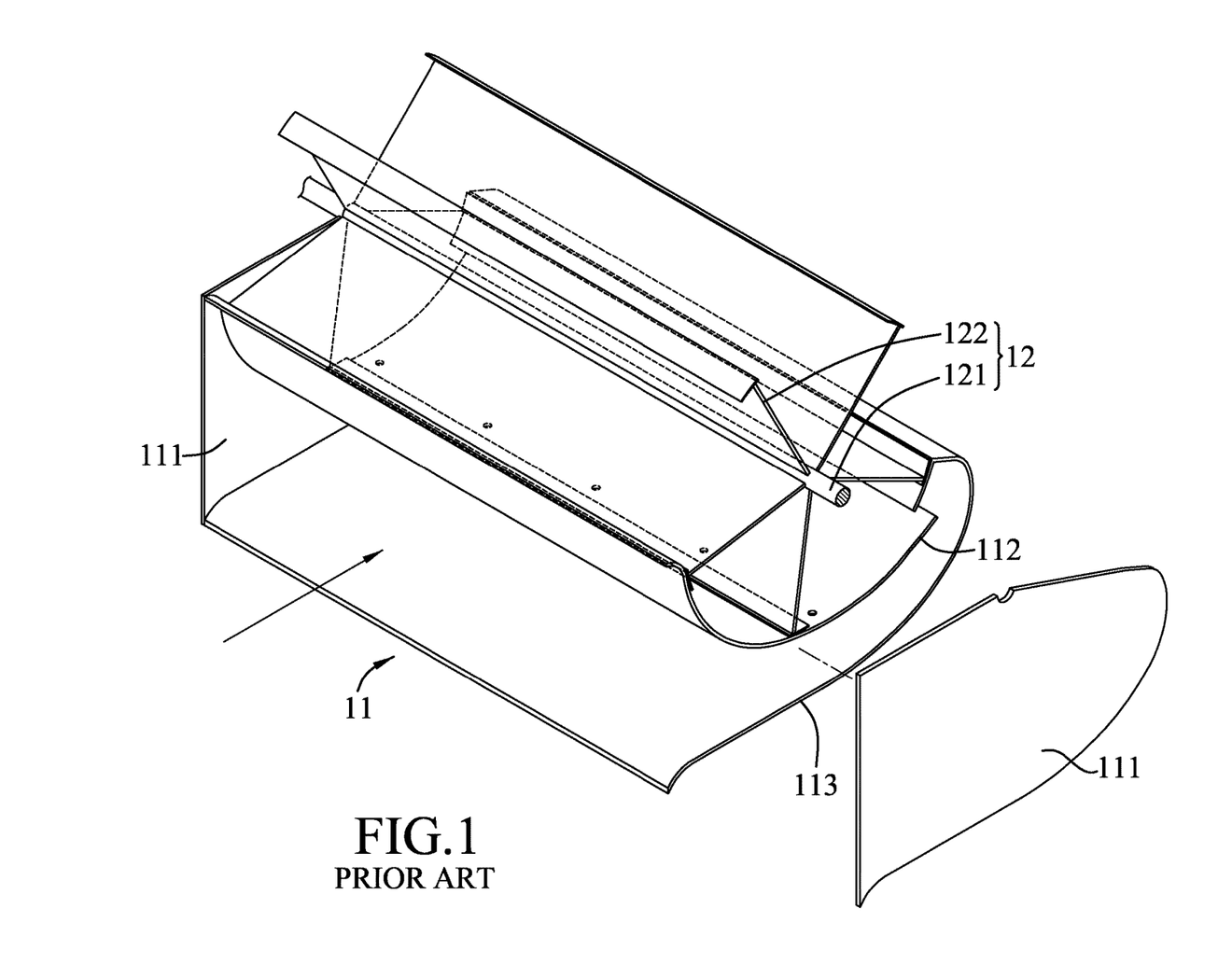
FIG. 1 is an exploded perspective view illustrating a conventional vane device.
Figure 2:
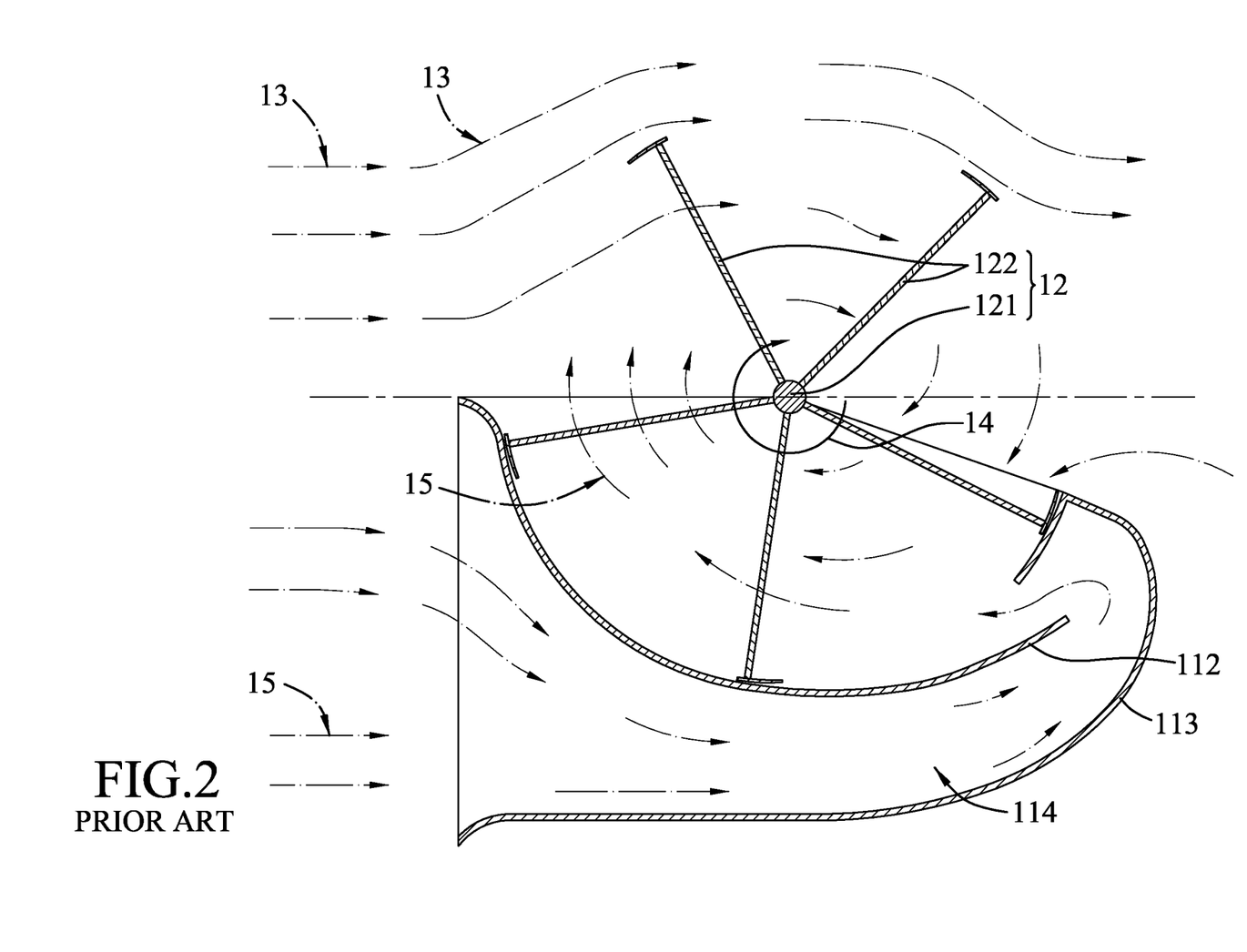
FIG. 2 is a sectional view of the conventional vane device.

Referring to FIGS. 1 and 2, a conventional vane device using wind or water energy to drive a power generator (not shown) that generates electricity is shown. The conventional vane device includes a flow guide casing 11 and a rotary unit 12 rotatably mounted on the flow guide casing 11. The flow guide casing 11 includes two end covers 111, an inner casing wall 112 that is disposed below the rotary unit 12 and that is curved to have a curvature corresponding to a moving orbit of the rotary unit 12, and an outer casing wall 113 that is disposed below the inner casing wall 112 and that extends forward and upward and thereafter bends rearward. The rotary unit 12 includes a rotary shaft 121 rotatably mounted on tops of the end covers 111, and a plurality of vanes 122 extending radially and outwardly from the rotary shaft 121. Wind currents higher than the rotary shaft 121 (referred to as positive direction wind currents 13 hereinafter) drive the vanes 122 to rotate the rotary shaft 121 in a rotation direction 14 for generation of electricity. The inner casing wall 112 guides wind currents lower than the rotary shaft 121 (referred to as bottom wind currents 15 hereinafter) to drive rotation of the vanes 122 in the rotation direction 14. The end covers 111 and the inner casing wall 112 bound a flow guide passage 114. The flow guide passage 114 diverts the bottom wind currents 15 to follow the rotation direction 14 for driving the vanes 122. The bottom wind currents 15 are therefore efficiently utilized. However, when the bottom wind currents 15 flow upward after driving the vanes 122 and meet the positive direction wind currents 13, the amount of the positive direction wind currents 13 is increased, and a large amount of the positive direction wind currents 13 are pushed upward as depicted in FIG. 2 so that they are unable to effectively act on the vanes 122. Therefore, the efficiency of the conventional vane device for electrical power generation is reduced.

SUMMARY

Therefore, an object of the disclosure is to provide a vane device that can alleviate the drawback of the prior art.

According to the disclosure, a vane device for generation of electricity includes a rotary unit and a shroud unit.

The rotary unit includes a rotary shaft extending in a left-right direction of the vane device, a first support unit on which the rotary shaft is disposed rotatably, and a plurality of vanes extending radially and outwardly from the rotary shaft. Each of the vanes has a distal end distal from the rotary shaft, and a radial length extending radially from the rotary shaft to the distal end. Each of the vanes is configured to be driven by a fluid stream to rotate the rotary shaft in a first direction, wherein, when the rotary shaft rotate in the first direction, the distal end of each of the vanes consecutively rotates to an orbit front position, which is in front of the rotary shaft, an orbit lowest position, which is beneath the rotary shaft, and an orbit rear position, which is at the rear of the rotary shaft.

The shroud unit includes a bottom plate section and a blocking plate section. The bottom plate section is disposed below the rotary unit and extends in the left-right direction. The blocking plate section is disposed at a rear side of the rotary unit in a spaced apart manner. The blocking plate section has a bottom end disposed rearwardly of the bottom plate section, and a top end disposed at a position that is higher than the bottom end and that is at the rear of the vanes. The blocking plate section extends rearward and upwardly from the bottom end to the top end. A distance from the top end to the rotary shaft that is measured along a front-rear direction is 1.4 to 3 times the radial length of each of the vanes. The blocking plate section is configured to prevent the fluid stream from driving rotation of the vanes in a second direction opposite to the first direction when the vanes rotate in the first direction at a level below the top end.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
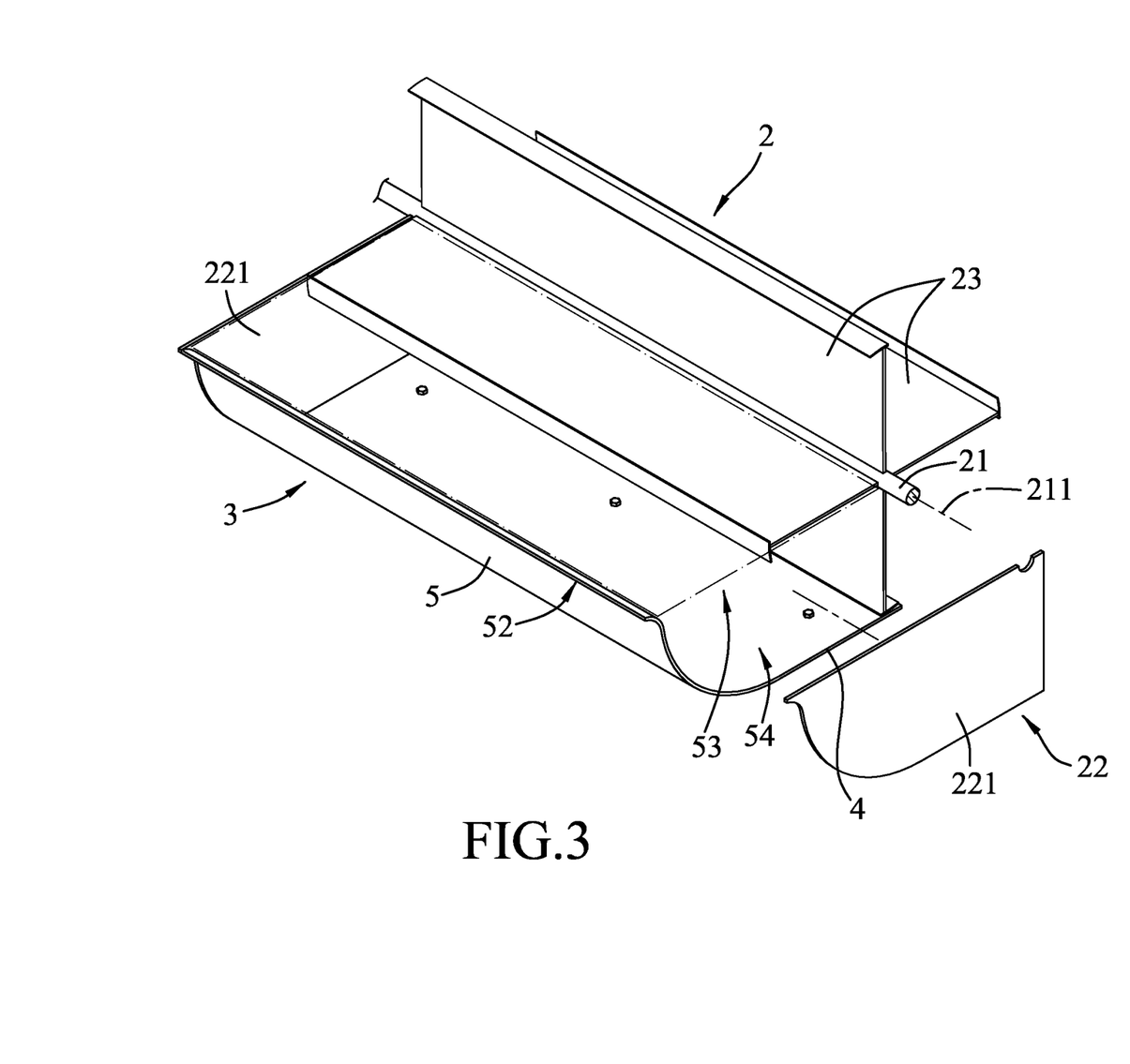
FIG. 3 is an exploded perspective view, illustrating a vane device according to a first embodiment of the present disclosure.
Figure 4:
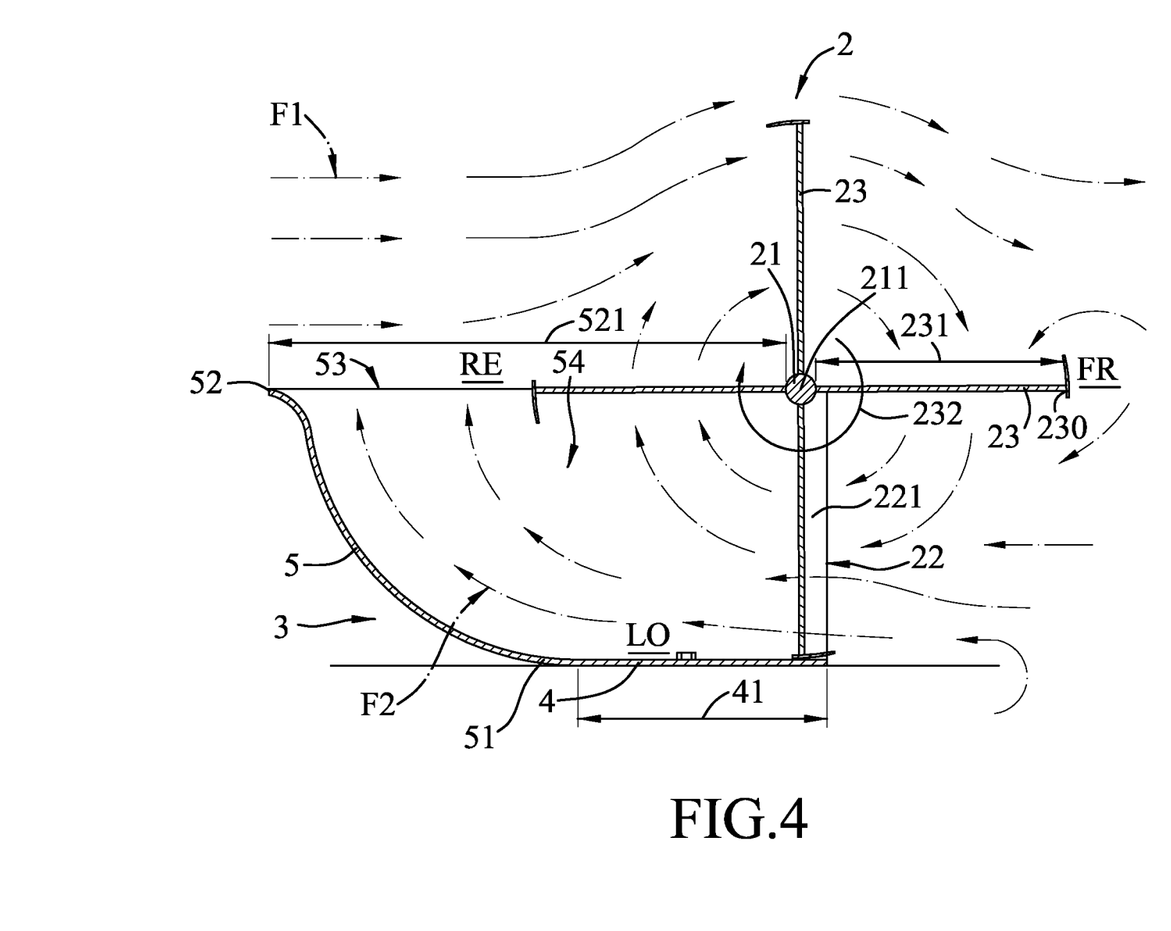
FIG. 4 is a sectional view of the first embodiment.

Referring to FIGS. 3 and 4, there is shown a vane device according to a first embodiment of the disclosure that is adapted to be coupled to an electrical power generator (not shown) for generation of electricity by a fluid stream, such as a stream of wind or water. The vane device includes a rotary unit 2 and a shroud unit 3.

The rotary unit 2 includes a rotary shaft 21 extending in a left-right direction 211 of the vane device, a first support unit 22 on which the rotary shaft 21 is disposed rotatably, and four vanes 23 extending radially and outwardly from the rotary shaft 21. The rotary shaft 21 is coupled to the electrical power generator (not shown). The first support unit 22 includes two lateral plates 221 that are spaced apart from each other along the left-right direction 211 and that connect the shroud unit 3. Two opposite ends of the rotary shaft 21 are rotatably and respectively disposed on top ends of the lateral plates 221. Each vane 23 has a distal end 230 distal from the rotary shaft 21, and a radial length 231 extending radially from the rotary shaft 21 to the distal end 230. In this embodiment, each vane 23 is lengthened in the left-right direction 211. Each vane 23 is configured to be driven by the fluid stream to rotate the rotary shaft 21 in a first direction 232. When the rotary shaft 21 rotates in the first direction 232, the distal end 230 of each vane 23 consecutively rotates to an orbit front position (FR), which is in front of the rotary shaft 21, an orbit lowest position (LO), which is beneath the rotary shaft 21, and an orbit rear position (RE), which is at the rear of the rotary shaft 21.

The shroud unit 3 includes a bottom plate section 4 and a blocking plate section 5.

The bottom plate section 4 is disposed below the rotary unit 2, and extends lengthwise in the left-right direction 211. In this embodiment, a width 41 of the bottom plate section 4 in a front-rear direction (i.e., a direction along a line extending through the orbit front and rear positions (FR, RE)) is one time the radial length 231 of each of the vanes 23. A front end of the bottom plate section 4 is disposed straightly below the rotary shaft 21 at the orbit lowest position (LO), and projects slightly in a frontward direction from the orbit lowest position (LO). A rear end of the bottom plate section 4 connects the blocking plate section 5. In other embodiments, the width 41 of the bottom plate section 4 may vary. The front end of the bottom plate section 4 may be aligned with the rotary shaft 21 in a top-bottom direction without projecting forwardly.

The blocking plate section 5 is disposed at a rear side of the rotary unit 2 in a spaced apart manner. The blocking plate section 5 has a bottom end 51 connecting unitarily and extending rearwardly from the bottom plate section 4, and a top end 52 disposed at a position that is higher than the bottom end 51 and that is at the rear of the vanes 23. The blocking plate section 5 is curved rearward and upwardly from the bottom end 51 to the top end 52 of the blocking plate section 5. The bottom end 51 of the blocking plate section 5 is not higher than the orbit lowest position (LO). The top end 52 of the blocking plate section 5 is not higher than the rotary shaft 21. In this embodiment, the top end 52 of the blocking plate section 5 and the rotary shaft 21 are nearly at the same height so that the fluid stream of wind above the blocking plate section 5 (hereinafter referred to as positive direction wind stream F1) is able to propel the vanes 23 above the rotary shaft 21 for rotation in the first direction 232. The blocking plate section 5 prevents the positive direction wind stream F1 from driving rotation of the vanes 23 in a second direction opposite to the first direction 232 when the vanes 23 rotate in the first direction 232 at a level below the top end 52. A distance 521 from the top end 52 to the rotary shaft 21 that is measured along the front-rear direction is 2 times the radial length 231 of each of the vanes 23. The top end 52, the lateral plates 221 and the rotary shaft 21 cooperatively bound a confluence opening 53 with a width equal to the distance 521. The blocking plate section 5, the bottom plate section 4 and the lateral plates 221 cooperatively define a rotation space 54 communicating the confluence opening 53. The vanes 23 below the top end 52 of the blocking plate section 5 and the rotary shaft 21 are allowed to rotate in the rotation space 54. While the top end 52 of the blocking plate section 5 is not higher than the rotary shaft 21 in this embodiment, according to some embodiments, the top end 52 of the blocking plate section 5 may be slightly higher than the rotary shaft 21.

During operation, the vanes 23 above the rotary shaft 21 are propelled by the positive direction wind stream F1 to rotate the rotary shaft 21 in the first direction 232, thereby driving the power generator (not shown) to generate the electrical power. The rotation of the vanes 23 in the first direction 232 causes the fluid stream below the front of the rotary shaft 21 to turn into a bottom stream F2 that flows rearward in the rotation space 54. Because the width of the confluence opening 53 at an upper side of the rotation space 54 is equal to the distance 521 and is larger than the width of a lower part of the rotation space 54, which corresponds to the radial length 231 of each of the vanes 23, when the bottom stream F2 flows upward in the rotation space 54 toward the wide upper confluence opening 53 from a narrow lower region of the rotation space 54, the flowing speed thereof decreases. Therefore, when the positive direction wind stream F1 flows past the confluence opening 53 and meets the bottom stream F2, influence of the bottom stream F2 on the positive direction wind stream F1 is reduced. As such, the positive direction wind stream F1 can effectively act on the vanes 23 for efficient generation of electricity.

In this embodiment, while the distance 521 is 2 times the radial length 231 of each of the vanes 23, the distance 521 may be 1.4 to 3 times the radial length 231 of each of the vanes 23, for example, 1.5, 1.6, 2, or 2.5 times. Notably, when the distance 521 is less than 1.4 times the radial length 231 of each of the vanes 23, influence of the bottom stream F2 is insufficiently reduced and is unable to meet usage requirements. On the other hands, when the distance 521 is greater than 3 times the radial length 231 of each of the vanes 23, it results in a poor effect of the blocking plate section 5 for preventing reverse rotation of the vanes 23, i.e., rotation in the opposite second direction, at the level below the top end 52 of the blocking plate section 5.

Figure 5:
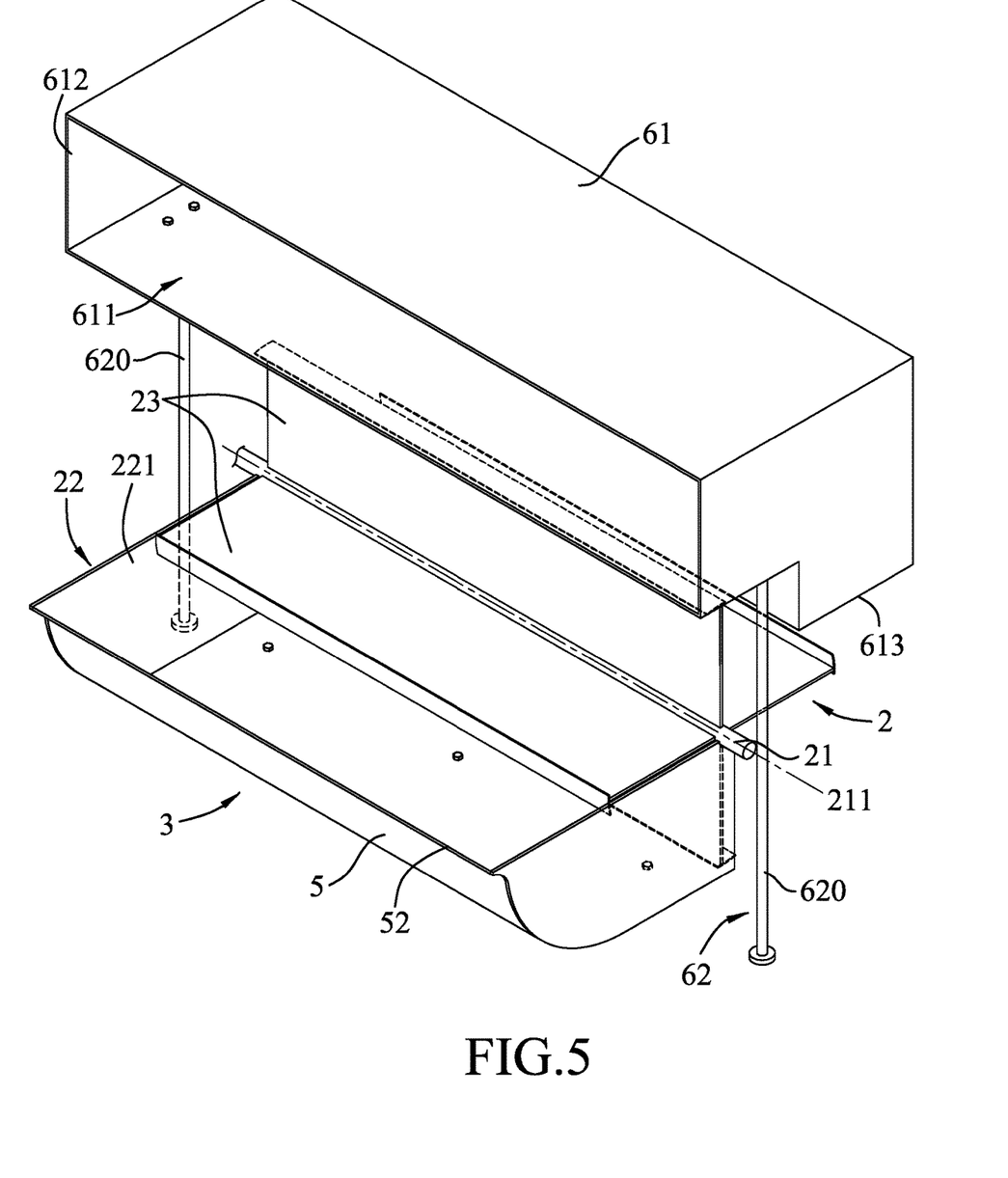
FIG. 5 is an exploded view, illustrating a vane device according to a second embodiment of the present disclosure.
Figure 6:
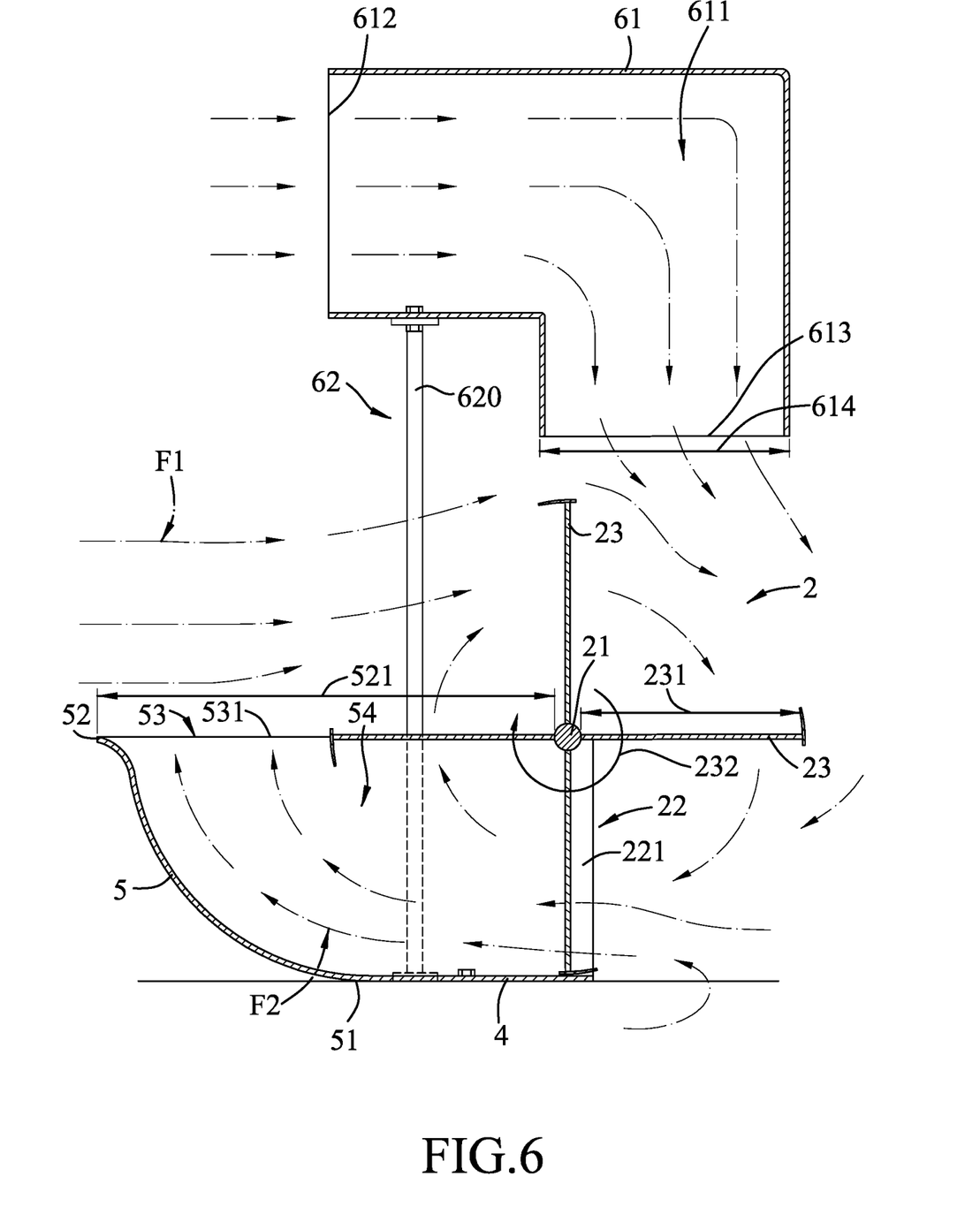
FIG. 6 is a sectional view of the second embodiment.

Referring to FIGS. 5 and 6, a vane device according to a second embodiment of the disclosure is generally similar to the first embodiment. However, in this embodiment, the vane device of the disclosure further includes a pipe 61 disposed above the rotary unit 2 and the bottom plate section 4, and a second support unit 62 supporting the pipe 61 above the rotary unit 2 and the bottom plate section 4. The pipe 61 has a width in the left-right direction 211 nearly equal to a width of each vane 23, and a channel 611 that extends forwardly and thereafter bends downwardly. The channel 611 has a rear opening 612 facing rearward, and a bottom opening 613 facing the vanes 23 at the front of the rotary shaft 21. The bottom opening 613 of the channel 611 has a bottom width 614 that is measured along the front-rear direction and that is one time the radial length 231 of each vane 23. Therefore, the channel 611 allows the fluid stream to flow downward from above the rotary unit 2 and to effectively drive rotation of the vanes 23 at the front of the rotary shaft 21 in the first direction 232. The second support unit 62 includes two support rods 620 spaced apart from each other in the left-right direction 211. The support rods 620 extend upward from the ground and support the pipe 61.

In the second embodiment, the pipe 61 is capable of directing fluid streams downward from above the vanes 23 to drive the rotation of the vanes 23 at the front of the rotary shaft 21, thereby enhancing effectiveness and efficiencies for generation of electricity.

Figure 7:
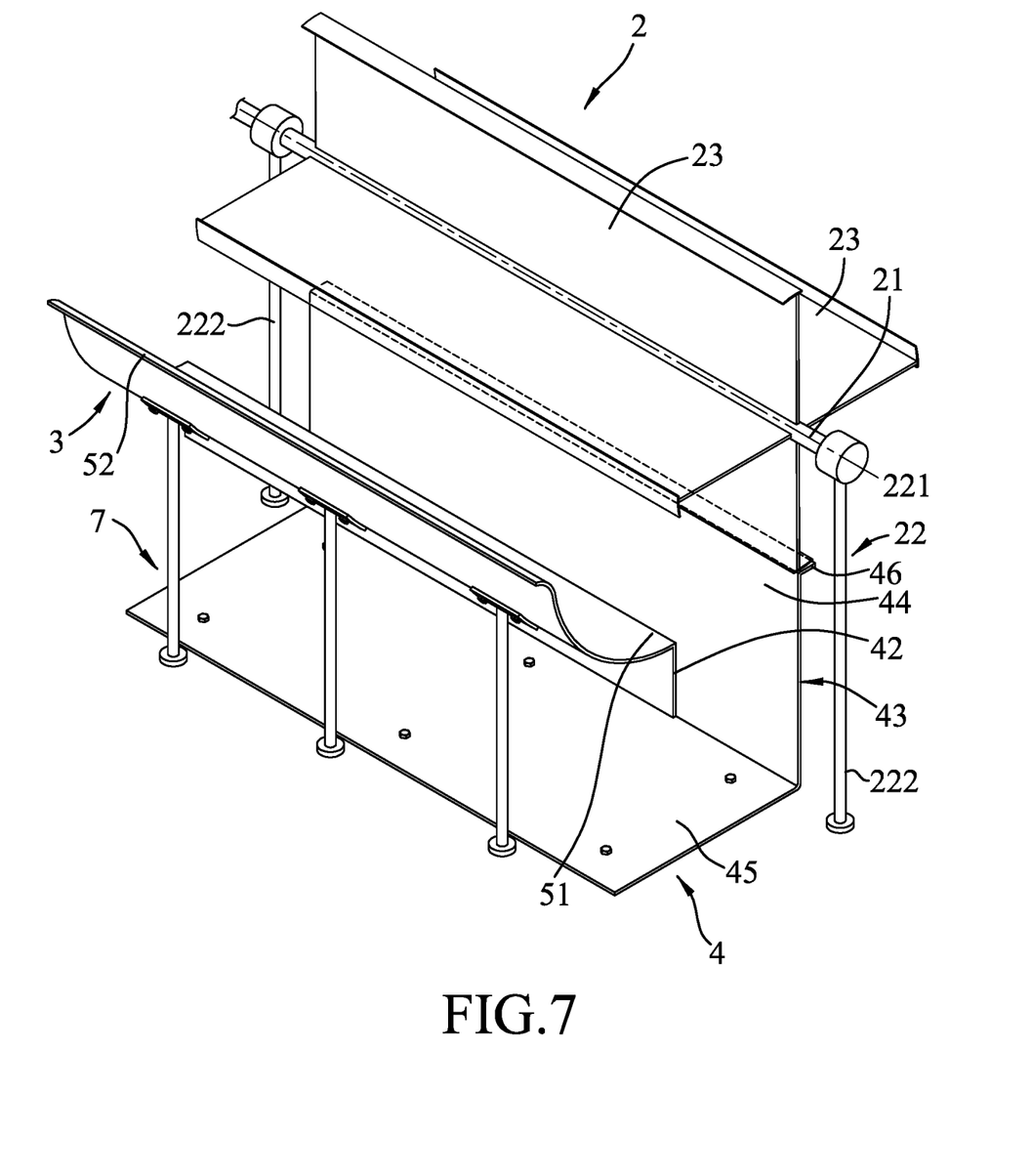
FIG. 7 is an exploded view, illustrating a vane device according to a third embodiment of the present disclosure.
Figure 8:
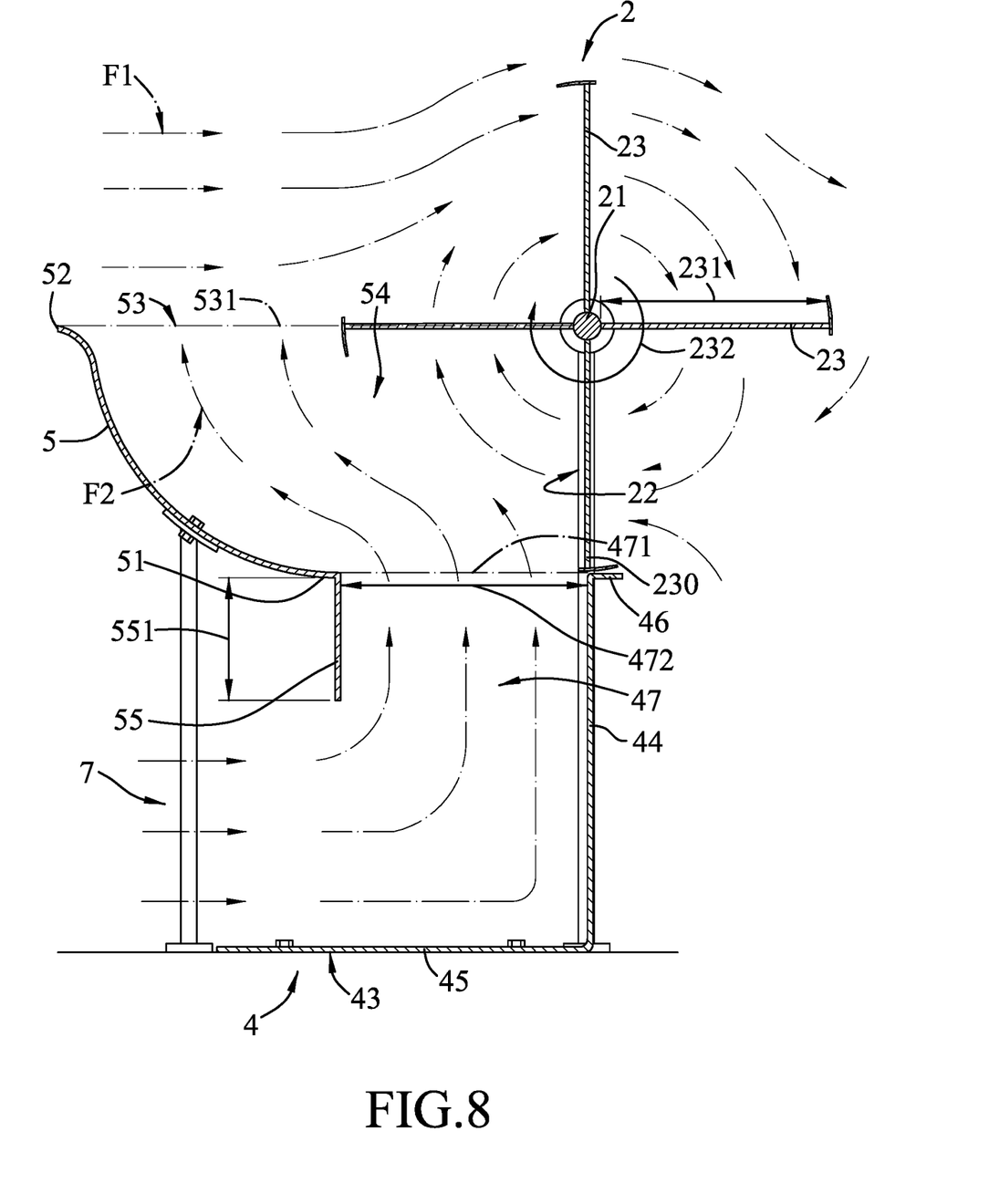
FIG. 8 is a sectional view of the third embodiment.

Referring to FIGS. 7 and 8, a vane device according to a third embodiment of the disclosure is generally similar to the first embodiment. However, in this embodiment, the first support unit 22 includes two support rods 222 that are spaced apart from each other in the left-right direction 221 and that support the rotary shaft 21 in a rotatable fashion. The shroud unit 3 further includes a third support unit 7 to lift the blocking plate section 5. The blocking plate section 5 further has a downward flange 55 extending downwardly from the bottom end 51 of the blocking plate section 5. The downward flange 55 has a flange top end connected to the bottom end 51 of the blocking plate section 5, and a flange bottom end below the flange top end. A length 551 that is measured from the flange top end to the flange bottom end is a half of the radial length 231 of each of the vanes 23. The bottom plate section 4 has a base plate 43 disposed below the rotary shaft 21. The third support unit 7 includes a plurality of support rods lifting the blocking plate section 5.

The base plate 43 has a front base plate portion 44, a lower base plate portion 45, and a forward extension portion 46 projecting forwardly from a top end of the front base plate portion 44.

The front base plate portion 44 is disposed below the orbit lowest position (LO) and extends in the top-bottom direction in front of the downward flange 55. The top end of the front base plate portion 44 is lower than the orbit lowest position (LO). In an embodiment, the top end of the front base plate portion 44 is aligned with the orbit lowest position (LO). The lower base plate portion 45 connects a bottom end of the front base plate portion 44 and extends rearward to a position below the downward flange 55. The blocking plate section 5 and the base plate 43 cooperatively bound a flow passage 47. The flow passage 47 has a top opening 471 that is formed between the downward flange 55 of the blocking plate section 5 and the top end of the front base plate portion 44 and that faces toward the vanes 23 at the rear of the rotary shaft 21. The flow passage 47 is configured to allow the fluid stream to flow upward through the top opening 471 of the flow passage 47 from below the blocking plate section 5 and to drive rotation of the vanes 23 at the rear of the rotary shaft 21 in the first direction 232. The top opening 471 has a top width 472 that is measured from the flange top end of the downward flange 5 to the top end of the front base plate portion 44 along the front-rear direction and that is one time the radial length 231 of each of the vanes 23. The vane device of this embodiment is capable of directing the fluid stream from below the blocking plate section 5 to drive rotation of the vanes 23 at the rear of the rotary shaft 21 in the first direction 232, thereby enhancing the efficiency of generating electricity.

To sum up, because the distance 521 from the top end 52 of the blocking plate section 5 to the rotary shaft 21 is 1.4 to 3 times the radial length 231 of each vane 23, the area where the bottom stream F2 begins to merge with the positive direction wind stream F1 is enlarged. As the flow speed of the bottom stream F2 decreases when reaching the enlarged area, the influence of the bottom stream F2 on the positive direction wind stream F1 is reduced. By reducing the influencing effect of the bottom stream F2, the problem of the prior art in which the bottom stream 15 (FIG. 2) causes a large amount of the positive direction wind currents 13 (FIG. 2) to rise or divert upward is avoided for enhancing the efficiency of generating electricity.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A vane device adapted for generation of electricity, comprising:
    a rotary unit including a rotary shaft extending axially in a left-right direction of the vane device, a first support unit on which said rotary shaft is disposed rotatably, and a plurality of vanes extending radially and outwardly from said rotary shaft, each of said vanes having a distal end distal from said rotary shaft, and a radial length extending radially from said rotary shaft to said distal end, each of said vanes being configured to be driven by fluid to rotate said rotary shaft in a first direction, wherein, when said rotary shaft rotates in the first direction, said distal end of each of said vanes consecutively rotates to an orbit front position, which is in front of said rotary shaft, an orbit lowest position, which is beneath said rotary shaft, and an orbit rear position, which is at the rear of said rotary shaft; and
    a shroud unit including a bottom plate section and a blocking plate section, said bottom plate section being disposed below said rotary unit and extending in the left-right direction, said blocking plate section disposed at a rear side of said rotary unit in a spaced apart manner, said blocking plate section having a bottom end disposed rearwardly of said bottom plate section, and a top end disposed at a position that is higher than said bottom end and that is at the rear of said vanes, said blocking plate section extending rearward and upwardly from said bottom end to said top end, a distance from said top end to said rotary shaft that is measured along a front-rear direction being 1.4 to 3 times said radial length of each of said vanes, said blocking plate section being configured to prevent the fluid stream from driving said vanes to rotate in a second direction opposite to the first direction when said vanes rotate in the first direction at a level below said top end.

2. The vane device as claimed in claim 1, wherein said bottom end of said blocking plate section is not higher than said lowest position of said distal ends of said vanes, said top end of said blocking plate section is not higher than said rotary shaft.

3. The vane device as claimed in claim 2, wherein a front end of said bottom plate section is disposed beneath said rotary shaft, a rear end of said bottom plate section connecting said bottom end of said blocking plate section, a width of said bottom plate section in the front-rear direction being one time said radial length of each of said vanes.

4. The vane device as claimed in claim 3, wherein said blocking plate section is curved from said bottom end to said top end of said blocking plate section.

5. The vane device as claimed in claim 1, further comprising a pipe disposed above said rotary unit and said bottom plate section, and a second support unit supporting said pipe above said rotary unit and said bottom plate section, said pipe having a channel that extends forwardly and thereafter bends downwardly, said channel having a rear opening facing rearward, and a bottom opening facing said vanes at the front of said rotary shaft, said channel being configured to allow the fluid stream to flow downward from above said rotary unit and to drive rotation of said vanes at the front of said rotary shaft in the first direction.

6. The vane device as claimed in claim 5, wherein said bottom opening of said channel has a bottom width that is measured along the front-rear direction and that is one time said radial length of each of said vanes.

7. The vane device as claimed in claim 1, wherein said shroud unit further includes a third support unit lifting said blocking plate section, said blocking plate section further having a downward flange extending downwardly from said bottom end of said blocking plate section, said bottom plate section having a base plate disposed below said rotary shaft, said base plate having a front base plate portion and a lower base plate portion, said front base plate portion disposed beneath said orbit lowest position and extending in a top-bottom direction in front of said downward flange, said lower base plate portion connecting a bottom end of said front base plate portion and extending rearward to a position below said downward flange, a top end of said front base plate portion being lower than said orbit lowest position, said blocking plate section and said base plate cooperatively bounding a flow passage, said flow passage having a top opening that is formed between said downward flange 55 of said blocking plate section and said top end of said front base plate portion and that is directed toward said vanes at the rear of said rotary shaft, said flow passage being configured to allow the fluid stream to flow upward through said top opening of said flow passage from below said blocking plate section and to drive rotation of said vanes at the rear of said rotary shaft in the first direction.

8. The vane device as claimed in claim 7, wherein said front base plate portion further has a forward extension portion projecting forwardly from said top end of said front base plate portion.

9. The vane device as claimed in claim 7, wherein said downward flange has a flange top end connected to said bottom end of said blocking plate section, and a flange bottom end below said flange top end, a length that is measured from said flange top end to said flange bottom end being a half of said radial length of each of said vanes, said top opening having a top width that is measured from said flange top end to said top end of said front base plate portion along the front-rear direction and that is one time said radial length of each of said vanes.

* * * * *